(Model.)

H. H. TAYLOR.
METAL SCREW MACHINE.

No. 274,153. Patented Mar. 20, 1883.

Witnesses.
Robert Everett
J. A. Rutherford

Inventor:
Harrison H. Taylor.
By Geo. H. Lothrop.
Atty.

(Model.)

5 Sheets—Sheet 2.

H. H. TAYLOR.
METAL SCREW MACHINE.

No. 274,153. Patented Mar. 20, 1883.

Witnesses.
Robert Everett
J. A. Rutherford

Inventor:
Harrison H. Taylor.
By Geo. H. Lothrop.
Atty.

(Model.)
5 Sheets—Sheet 3.
H. H. TAYLOR.
METAL SCREW MACHINE.
No. 274,153. Patented Mar. 20, 1883.
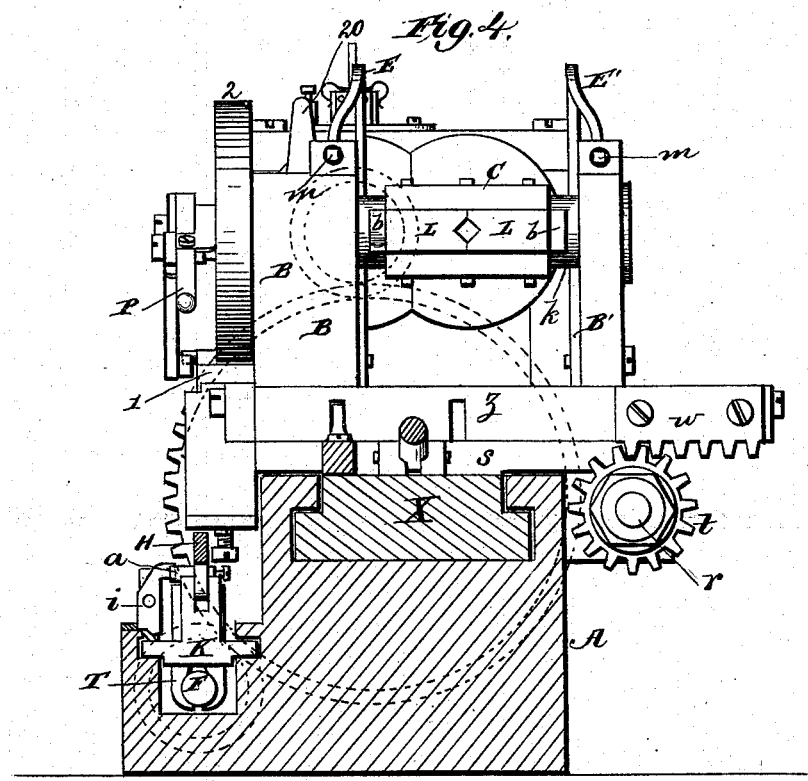
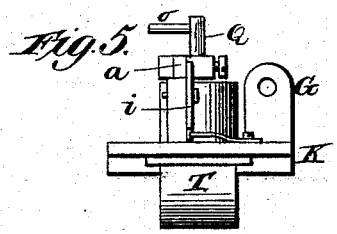
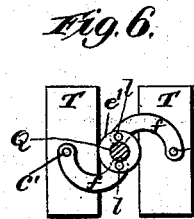
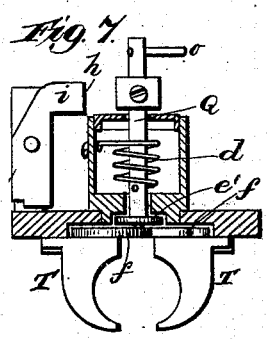
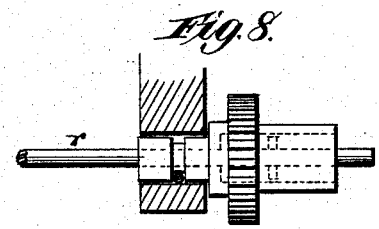
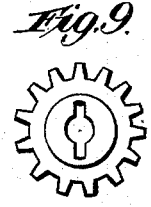
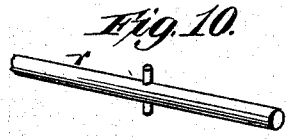
Witnesses.
Robert Everett
J. A. Rutherford
Inventor:
Harrison H. Taylor.
By Geo. H. Lothrop.
Atty.
N. PETERS, Photo-Lithographer, Washington, D. C.

(Model.)

H. H. TAYLOR.
METAL SCREW MACHINE.

No. 274,153. Patented Mar. 20, 1883.

Witnesses:
Geo. H. Carlisle
George Maitland

Inventor:
Harrison H. Taylor
per
Geo. H. Lothrop
Attorney (Model.)
H. H. TAYLOR.
METAL SCREW MACHINE.
No. 274,153. Patented Mar. 20, 1883.
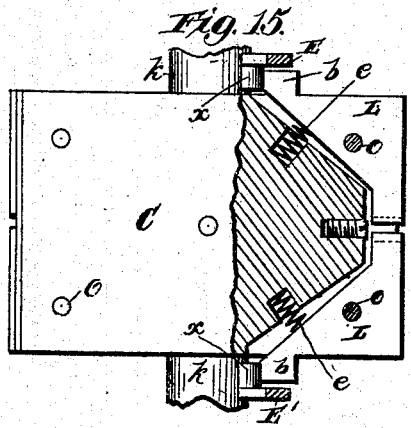
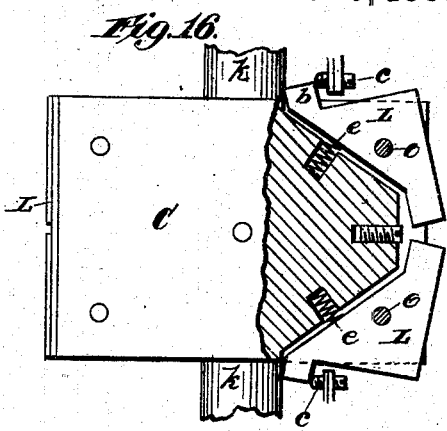
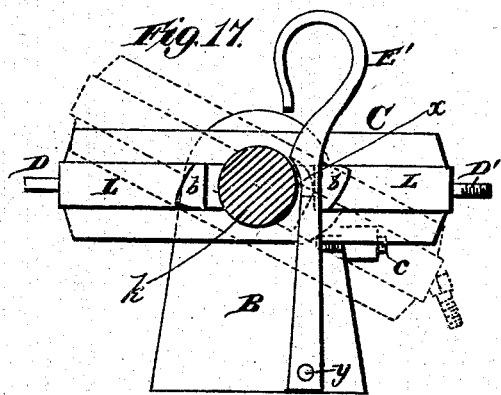
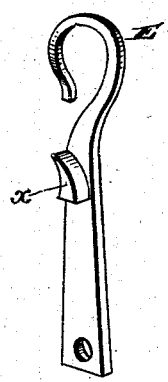
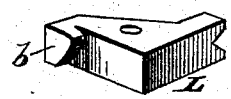
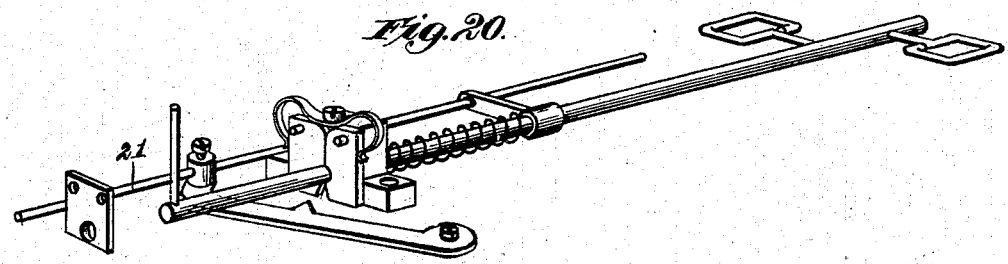
Witnesses.
Robert Everitt
J. A. Rutherford
Inventor:
Harrison H. Taylor.
By Geo. H. Lothrop,
Atty.
N. PETERS, Photo-Lithographer, Washington, D. C.

UNITED STATES PATENT OFFICE.

HARRISON H. TAYLOR, OF DETROIT, MICHIGAN, ASSIGNOR OF TWO-THIRDS TO GEORGE G. CLARKSON, OF ROCHESTER, NEW YORK, AND FRANK M. CLARKSON, OF DETROIT, MICHIGAN.

METAL-SCREW MACHINE.

SPECIFICATION forming part of Letters Patent No. 274,153, dated March 20, 1883.

Application filed March 7, 1882. (Model.)

*To all whom it may concern:*

Be it known that I, HARRISON H. TAYLOR, of Detroit, in the county of Wayne and State of Michigan, have invented a new and useful Improvement in Metal-Screw Machines, of which the following is a specification.

Figure 1:
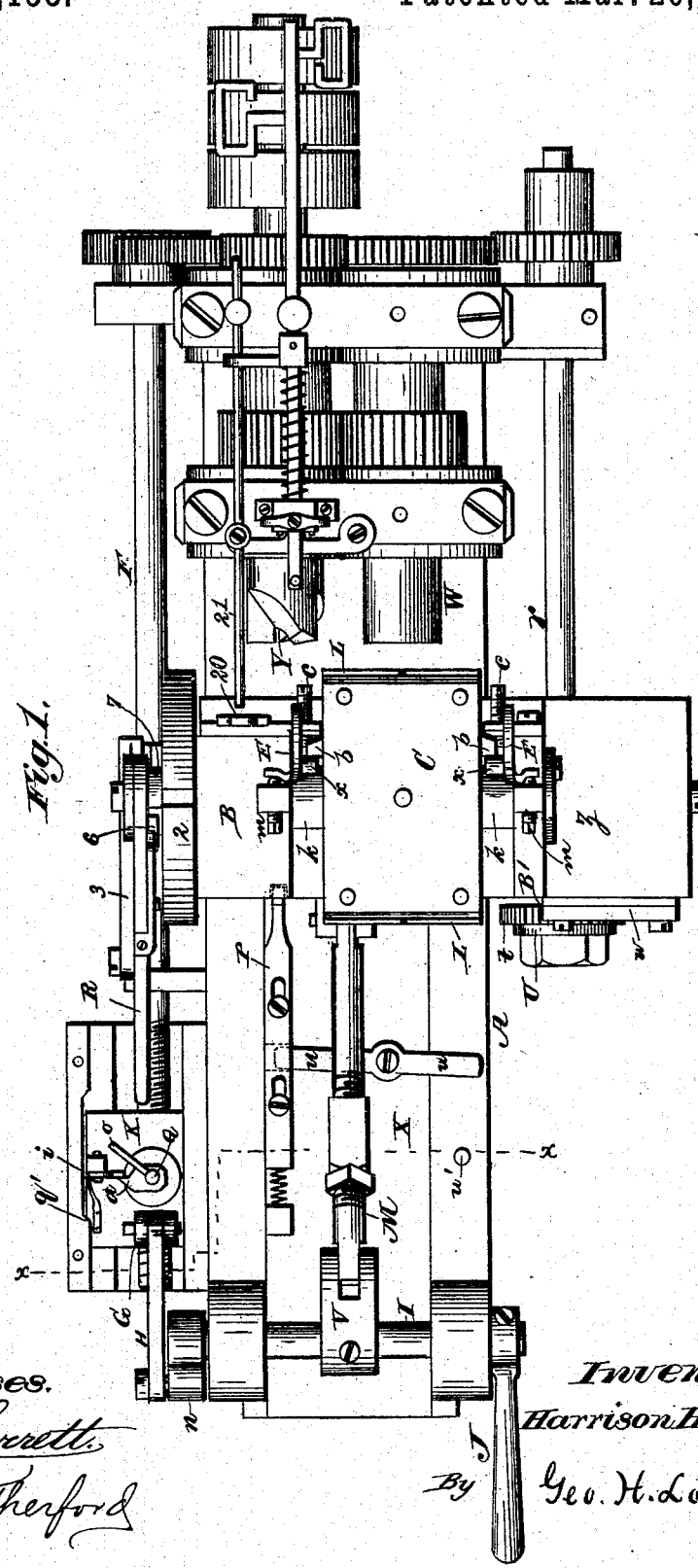
Figure 2:
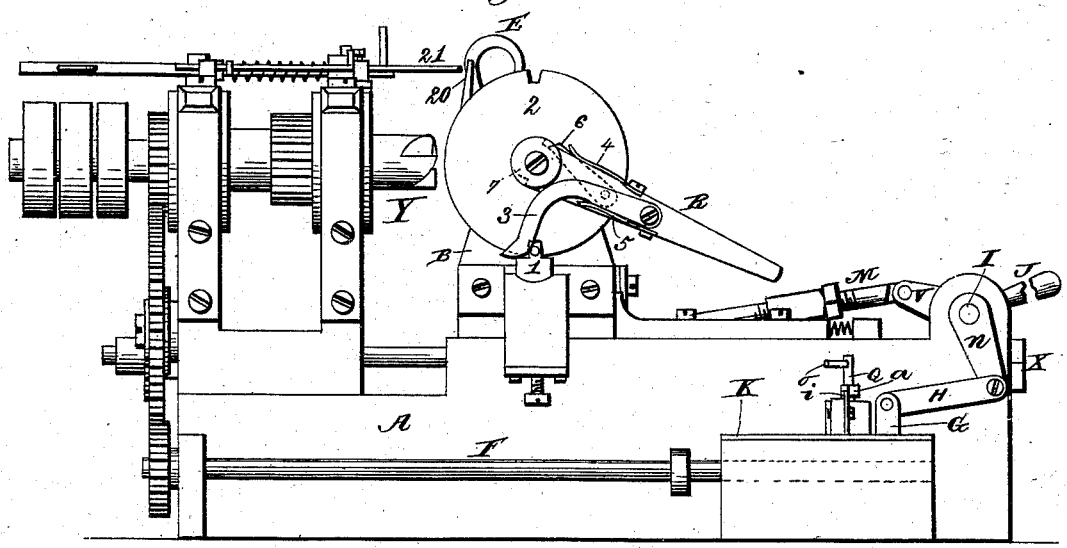
Figure 3:
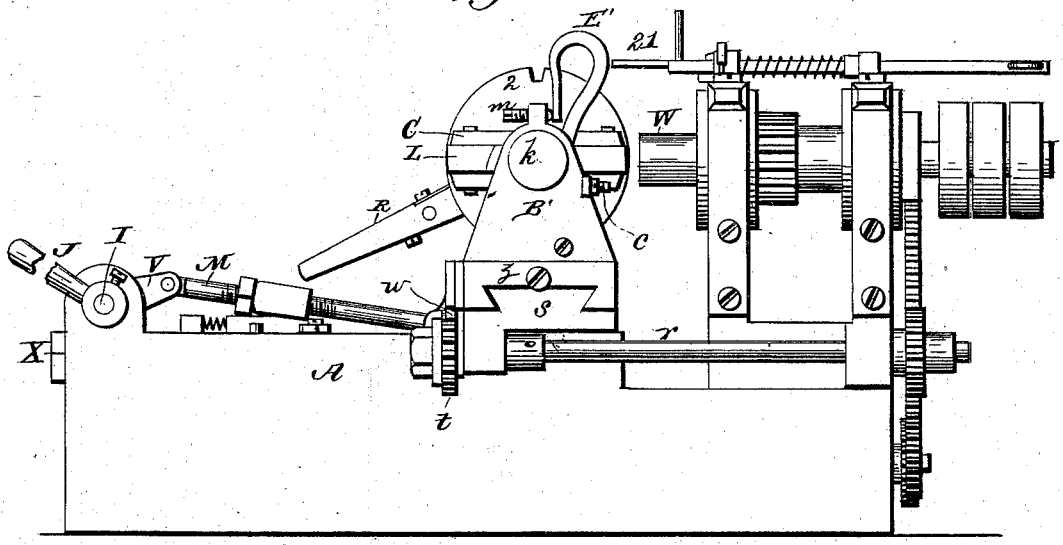
Figure 11:
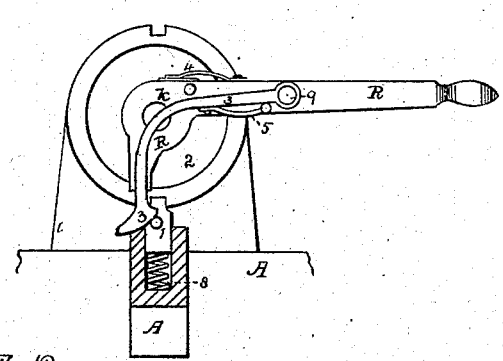
Figure 12:
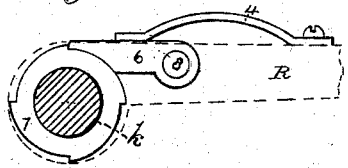
Figures 13, 14:
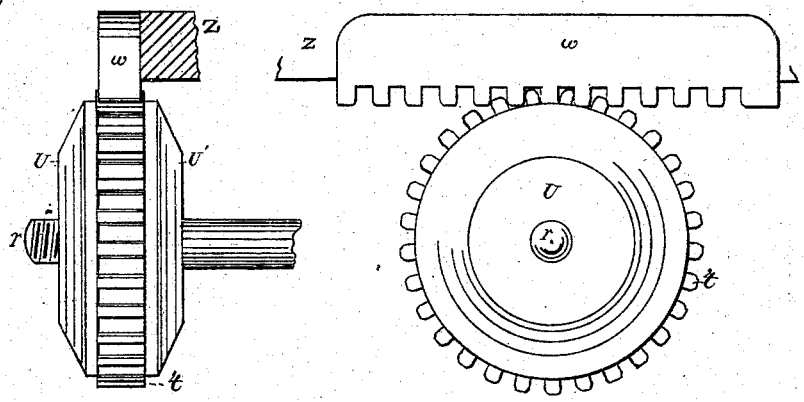

Figure 1 is a top or plan view of a machine constructed in accordance with my invention; Figs. 2 and 3, side elevations of the same, looking from opposite sides of the machine; Fig. 4, a transverse section on the line *x x* of Fig. 1; Figs. 5, 6, and 7, detail views of the feed-nut; Figs. 8, 9, and 10, detail views of the shafts and pinions. Figs. 11 and 12 are views of the mechanism for rotating and locking head C. Figs. 13 and 14 are views of the friction mechanism for sliding the carriage which carries head C. Figs. 15, 16, and 17 are detail views of the carriage or carrier. Fig. 18 is a detached view of one of the spring-cams; Fig. 19, a detached view of one of the jaws, and Fig. 20 a detached perspective view of the belt-shifting devices.

This invention relates to that class of screw-cutting machines in which the blanks are held between jaws carried by a rotatable head; and the invention consists in the novel combination and arrangement of parts, which will be fully hereinafter described in detail, and pointed out in the claims, a preliminary explanation not being deemed essential.

Referring to the accompanying drawings, A is the frame of the machine.

K is a sliding bed, supported in frame A and reciprocated by shaft F, which has a screw-thread cut on its end and works in shear-nut T, which is attached to sliding bed K. Shaft F may run constantly in one direction, or be reversed when the cutting mechanism is reversed.

G is a lug cast on sliding bed K, to the upper end of which is pivoted a connecting-rod, H, the other end of which is pivoted to the end of an arm, *n*, fastened to rock-shaft I. Rock shaft I is journaled in bearings in frame A, and has fastened to it another arm, V, to the end of which is pivoted a connecting-rod, M, the other end of which is pivoted to a lug cast on a sliding bed, X, so that as sliding bed K is reciprocated sliding bed X will be also reciprocated, and its motion as it travels toward the right, Fig. 1, will become slower as arm V and connecting-rod M approach a straight line.

*s* is a cross-piece fastened to sliding bed X, and extending above frame A.

*z* is a carriage fastened to cross-piece *s* by a dovetail joint, so that carriage *z* must move with sliding bed X, and can also be moved independently at right angles to the line of travel of said sliding bed X. B B' are uprights cast on carriage *z*.

*k* is a shaft journaled in bearings in uprights B B'.

C is a metal head securely fastened to and turning with shaft *k*. At each end of head C recesses are cut, in each of which is set a pair of jaws, L L, said jaws being pivoted on pins O O, which run through said head and jaws. Said jaws are provided with recesses on their faces to receive the square head of a bolt, Fig. 4, and the inner ends of said jaws are continued, so as to form a projection, *b*, on each.

*e e* are small spiral springs, which keep the jaws L L lightly closed.

E E' are strong springs, attached at *y* to the uprights B B', and each provided with a projection or cam, (marked *x* in Figs. 15 and 18.) At the top of uprights B B' are small set-screws *m*, by which springs E E' may be regulated. Fastened to the sides of uprights B B' are small set-screws *c*, the office of which will be hereinafter explained.

2, Fig. 11, is a wheel fastened to one end of shaft *k*, and having two notches therein to receive the dog 1, by which shaft *k* can be firmly held in one of two positions.

7, Fig. 12, is a ratchet-wheel fastened to the end of shaft *k*.

R is a lever sleeved on the end of shaft *k*, and having thereon a spring-pawl, 6, engaging with ratchet-wheel 7, and having also a pivoted arm, 3, which forces dog 1 down when lever R is raised, thereby releasing wheel 2 and allowing shaft *k* to turn. When lever R is lowered, arm 3, owing to the peculiar formation of its end, passes under the pin in dog 1, being allowed to do this by the small supporting-spring 5, and as soon as said arm passes said pin spring 5 raises said arm into position to again force dog 1 downward, when lever R is raised.

$w$ is a rack fastened to one side of carriage $z$, and $t$ is a pinion loosely set on shaft $r$ and meshing into rack $w$.

U U' are friction-collars, fastened to and turning with shaft $r$, and they constantly tend to turn pinion $t$, and thus move rack $w$; but as carriage $z$ is firmly locked to cross-piece $s$ by pawl P said friction-collars U U' are only operative when pawl P is withdrawn from its engagement with carriage $z$ by the contact of the pivoted lever $u$ with a fixed stop or projection, $u'$, on the machine-frame, which occurs at the end of the backward travel of the sliding bed X, said lever being carried by the said bed, and its end fitting in a groove in the pawl P.

W is a shaft carrying on its outer end a screw-cutting die, and Y is a shaft carrying at its outer end a shanking or milling tool. Both of said shafts are journaled in suitable bearings in frame A, are in the same plane with and at right angles to shaft $k$, and have on their inner ends pinions meshing into each other, the pinion on one of said shafts meshing into a cog-wheel fastened to a shaft driven in the usual manner by a straight and a crossed belt, so that the direction of said shaft can be reversed.

Shear-nut T consists of two sides, each screw-threaded, and supported by the curved levers $f f$, Figs. 6 and 7. The inner ends of these curved levers are pivoted at $l$ $l$ to a wheel, $e'$, on the lower end of post Q, so that when said post is turned by the handle $o$ shear-nut T either clamps shaft F or releases said shaft. Post Q may be operated entirely by the attendant who runs the machine, or it may be provided with a coil-spring, $d$, tending to keep nut T open, but prevented from acting by a stop, $i$, having the flange $h$, which engages with arm $a$, fastened to post Q.

When sliding bed K reaches the end of its stroke a cam projection, $q'$, on frame A rocks stop $i$, spring $d$ turns post Q, and nut T is opened, thus releasing the sliding bed K from the shaft F.

In the operation of the machine the attendant inserts a blank bolt, D, Fig. 17, in the jaws at the left. He then raises the lever R, thus turning shaft $k$ and head C until the said shaft has passed through half a revolution, when dog L catches in a notch in wheel 2 and holds head C firmly. As head C is turned the projections $b$ on the jaws which hold the finished screw D' pass below the cams $x$ and are no longer compressed by the springs E E'. The projections $b$ strike against the set-screws $c$, as shown in Fig. 16, and the jaws are forced open, thus releasing the finished screw, which falls from the jaws. The projections $b$ on the jaws which hold the blank bolt pass over the cams $x$, as shown in Fig. 15, and the jaws are compressed or forced together by the power of springs E E', thus holding the blank firmly and bringing the center of the head of the blank in the center of the jaws. The blank now being opposite the milling-tool Y, the nut T is clamped on shaft F and the blank is fed into the milling-tool. Owing to the relative positions of arms $n$ and V on rock-shaft I and the connection of said arm V with sliding bed X, the blank is fed to the milling-tool fastest when it first meets the tool, and the rate of feed constantly becomes slower until it ceases entirely when arm V and connecting-rod M are in a straight line. The result is that the milling-tool cuts rapidly on that part of the blank which is to receive the screw-thread, where the cut is generally light, and where it is not necessary to make a smooth finish, that being given by the screw-cutting die, and cuts very slowly and with increasing fineness toward the head of the blank, where the cut is generally heavy, and where the work must be left smooth, thus leaving the bolt smooth and without any burr whatever on the under side of the head. When the stroke has been completed stop $i$ strikes cam projection $q'$ on frame A, and nut T is opened by spring $d$, thus releasing sliding bed K from shaft F. The attendant then depresses lever J, which is fastened to rock-shaft I, and thus brings the bed X again into the position farthest from the cutting and threading tools. This causes lever $u$ to strike against the projecting stop $u'$ and withdraw pawl P from the notch in carriage $z$, and friction-collars U U' turn pinion $t$, and thus slide carriage $z$ on cross-piece $s$ until the head comes opposite die W, when pawl P drops into another notch in carriage $z$ and holds the same firmly in place. The attendant then raises lever J until die W takes hold of the bolt and cuts a screw-thread on it. During this operation the bolt is fed to the die W solely by the action of the die. When the thread is cut the required length on the bolt a finger, 20, placed on carriage $z$, strikes a belt-shifter, 21, connected with the straight and crossed belt which drive the machine and reverses the motion of die W, thus pushing head C away from the die. By this time the attendant has placed another blank in the jaws, which are empty, and by raising lever J he draws sliding bed X toward the front of the machine until lever $u$ strikes the stop $u'$ and disengages pawl P from carriage $z$, when friction-collars U U', whose motion was reversed when the motion of the die W was reversed, again actuate pinion $t$, and carriage $z$ is moved until head C is opposite the milling-tool Y, when pawl P again drops into a slot in the carriage and holds it firmly. The attendant now turns head C by means of lever R, the finished screw dropping from the jaws which held it, and the other jaws being clamped on the bolt, and the new bolt is cut in the manner above described.

What I claim as my invention, and desire to secure by Letters Patent, is—

1. The combination, with the milling-tool and threading-die of a screw-threading machine, of the longitudinally-reciprocating bed, the transversely-reciprocating carriage mounted in ways on said bed, the rotatable head mounted on and moving with the carriage and provided with blank-holding jaws, and mechanism, such substantially as described, for rotating the head and holding the jaws closed when they face the dies, and momentarily opening said jaws when they are moved in a direction away from the dies.

2. In a screw-cutting machine, the combination of the longitudinally-reciprocating bed, the transversely-reciprocating carriage, the rotatable head carried by a shaft mounted in bearings on the carriage, and provided with pairs of blank-holding jaws normally held closed by springs, a lever connected with the said shaft for rotating it and the head, and devices for holding one pair of jaws in a closed position when they face the dies and momentarily opening such pair of jaws when moved away from the dies, substantially as described.

3. In a screw-cutting machine, the combination of the rotatable head C, having two or more pairs of jaws, L, with the springs E E', having cam projections $x$, substantially as described.

4. In a screw-cutting machine, the combination of the rotatable head C, the pairs of jaws L, pivoted to said head, and each provided with a projection, $b$, with the springs E E', provided with the cam projections $x$, substantially as described.

5. In a screw-cutting machine, the combination of the following devices, to wit: a milling or shanking tool and a screw-cutting die, both arranged in the same horizontal plane, a rotatable head provided with opening and closing jaws, a carriage in which said head is journaled, said carriage being capable of transverse reciprocations, and a longitudinally-reciprocating bed, the carriage moving in the same horizontal plane as the milling or shanking tool and the screw-cutting die, substantially as and for the purpose described.

6. The rotatable head C, having jaws L L, with projections $b$ thereon, and pivots O, combined with springs E E', having cam projections $x$, and the set-screw $c$, substantially as described.

7. In a screw-cutting machine, the combination of a longitudinal screw-threaded shaft, F, sliding bed K, and a shear-nut, T, with a connecting-rod, H, transverse rock-shaft I, connecting-rod M, sliding bed X, and carriage $z$, carrying a blank-holding head, substantially as described.

8. In a screw-cutting machine, the combination of the screw-shaft F, sliding bed K, carrying a nut to engage and disengage the shaft, connecting-rod H, rock-shaft I, connecting-rod M, and sliding bed X, substantially as described.

9. In a screw-cutting machine, the combination, with a rotating milling-tool, a sliding bed, X, and a transversely-moving carriage, $z$, carrying devices for holding a blank and presenting it to the milling-tool, of rod M, rock-shaft I, having the attached arm V, pivoted to said rod, the arm $n$, rod H, and reciprocating bed K, all arranged in the relative position set forth and operating to move the sliding bed toward the milling-tool at a decreasing rate of speed, substantially as described.

HARRISON H. TAYLOR.

Witnesses:
GEO. H. CARLISLE,
SANDS F. MOORE.